United States Patent [19]

Davis

[11] Patent Number: 4,786,060
[45] Date of Patent: Nov. 22, 1988

[54] SEALANT SPRAY APPLICATOR SYSTEM AND METHOD EMPLOYING SAME

[75] Inventor: Keith B. Davis, Long Beach, Calif.

[73] Assignee: McDonnell Douglas Corporation, Long Beach, Calif.

[21] Appl. No.: 97,135

[22] Filed: Sep. 16, 1987

[51] Int. Cl.⁴ .................. E21B 33/00; B05C 9/02; B23P 25/00

[52] U.S. Cl. .......................... 277/1; 29/458; 118/711

[58] Field of Search .......... 277/1; 118/711, 203, 118/215; 156/242; 29/458; 141/311 R; 222/135, 326

[56] References Cited

U.S. PATENT DOCUMENTS

| | | | |
|---|---|---|---|
| 3,350,774 | 11/1967 | Bridges | 29/458 X |
| 4,144,625 | 3/1979 | Hogenhout | 118/215 X |
| 4,359,965 | 11/1982 | Bridges | 118/711 |
| 4,429,658 | 2/1984 | Jones | 118/711 |
| 4,635,827 | 1/1987 | Roedig | 222/326 X |

*Primary Examiner*—Donald A. Griffin
*Attorney, Agent, or Firm*—Max Geldin

[57] ABSTRACT

Method and system for applying liquid sealant in holes of a structural member prior to installing fasteners in such holes, which comprises mixing air with a liquid sealant, spraying a controlled amount of the resulting air-sealant mixture into the holes and depositing liquid sealant therein, and impinging an elevated pressure air stream on the deposited liquid sealant to spread the sealant out and produce a thin layer of sealant in the holes. A system for carrying out the method comprises a spray gun having separate air and liquid sealant paths which meet at the spray nozzle of the spray gun to achieve the mixing of air with the liquid sealant. The liquid spray system also includes a sealant applicator controller which is arranged to activate a series of timers and valves to provide controlled flow of high pressure air and liquid sealant to the nozzle for mixture therein, and spraying to form the sealant deposit, and to provide for continued high pressure flow of air on the layer of sealant deposit to spread the sealant and produce a thin sealant layer.

11 Claims, 2 Drawing Sheets

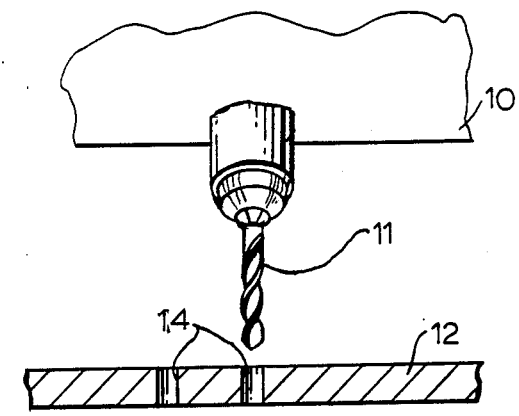
FIG. 1

FIG. 4 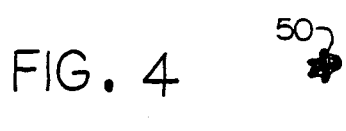 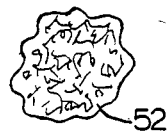

4,786,060

SEALANT SPRAY APPLICATOR SYSTEM AND METHOD EMPLOYING SAME

BACKGROUND OF THE INVENTION

This invention relates to liquid sealant application and is particularly concerned with a sealant spray applicator system and to a method for applying liquid sealant in holes of a structural member prior to installing fasteners in such holes, particularly employing such sealant spray applicator system.

In the wet installation of rivets and lockbolts for fastening structural members, particularly in the aircraft industry, a machine, commonly known as a "Drivematic", first drills a hole in the structural parts to be fastened, and when this is completed, the machine installs a fastener, such as a rivet or lockbolt. However, if such fastener installation requires a sealant to be placed in the hole first, a sealant applicator applies sealant in the hole by means of a tip or nozzle which is placed directly in contact with the hole. In this position, a valve is opened and the liquid sealant is squirted into the hole.

However, the use of such conventional type sealant applicator systems has a number of disadvantages. In the first place, generally in order to apply sufficient liquid sealant to satisfy the requirements, an excessive amount of sealant is applied. Thus, conventional sealant spray applicators are unable to provide the thin film of sealant application to holes particularly required for automated lockbolt installation. Further, as a result of an excessive amount of sealant application, parts of the sealant applicator at and adjacent to the nozzle become coated with the sealant, and there is also a tendency for constant dripping of liquid sealant from the nozzle. The result is that these parts of the sealant applicator require excessive cleaning. Further, conventional sealant applicators require an inventory of nozzles or tips for each hole diameter.

One object of the present invention is the provision of an improved sealant spray system and a method employing a sealant spray for application to holes of a structural member prior to installing fasteners in such holes.

Another object is to provide an improved sealant spray system and method employing same which reduces sealant waste and part clean-up requirements.

A particular object is the provision of means and a method for thin film sealing application for automated rivet and lockbolt installation.

Yet another object is to provide an improved sealant spray applicator system and method for applying liquid sealant readily to holes of varying diameters without changing nozzles or tips, as in the case of conventional sealant applicators.

SUMMARY OF THE INVENTION

The above objects are achieved, according to the invention, by the provision of a novel improved sealant spray applicator system and a method for applying liquid sealant in holes of a structural member prior to installing fasteners in such holes. The improved method comprises the steps of mixing air with a liquid sealant, spraying a controlled amount of the resulting air-sealant mixture into the holes and depositing liquid sealant therein, and impinging an elevated pressure air stream on the deposited liquid sealant to spread the sealant out and produce a thin layer of the sealant in the holes.

The process of mixing the liquid sealant with air is termed "air atomizing", and such technique mixes the sealant with the air to form a homogenous spray, prior to its impingement on the walls of the holes. After such impingement and the deposition of sealant on the walls of the holes, additional high pressure air is blown on the deposited sealant to thin it. Thus, the present invention applies the sealant in a more efficient manner, as contrasted to present processes employing conventional sealant applicators, in that the amount of sealant which is released, and the final thickness of the coating can be more readily controlled.

A sealant spray applicator is provided for efficiently carrying out the above process. Such spray applicator is in the form of an automatic air atomizing spray gun which mixes air into the liquid sealant to provide the ability to spray the liquid sealant into the holes in which fasteners are to be installed, and which also provides a high pressure air stream to thin the resulting deposited sealant. The sealant spray gun embodies separate air and fluid paths which meet at the nozzle for mixing of the air and liquid sealant and atomization thereof to provide the desired sealant spray. Such spray guns are activated by a sealant applicator controller which incorporate a system of valves and timers for actuating such valves, and which provides efficient sealant spray and air stream control, and prevents dripping of liquid sealant.

BRIEF DESCRIPTION OF THE DRAWINGS

The invention will be more clearly understood by reference to the description below of a preferred embodiment, taken in conjunction with the accompanying drawings wherein:

FIG. 1 illustrates a portion of a Drivematic for drilling a hole in a structural part for installing a fastener therein;

FIG. 4 is a schematic illustration showing the initial thick sealant deposit produced by spray application but before high pressure air application, and the resulting thin sealant deposit after high pressure air application to the initial sealant deposit, according to the invention.

DETAILED DESCRIPTION OF THE INVENTION AND PREFERRED EMBODIMENT

A part 12 in which a hole or holes are to be drilled for installation of fasteners therein is positioned as by clamping adjacent to the head 10 of a Drivematic machine (not shown). The head 10 has a drill 11 mounted thereon. The Drivematic machine is first actuated to drill a hole or holes 14 in the part.

Figure 2:
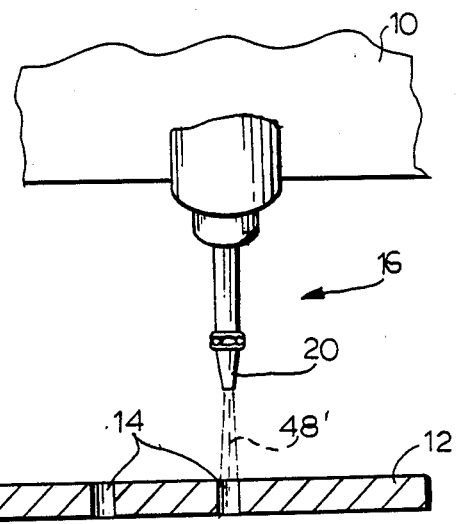
FIG. 2 illustrates a portion of a spray gun mounted on the Drivematic for sealant spray application of a liquid sealant to the drilled hole of the part.
Figure 3:
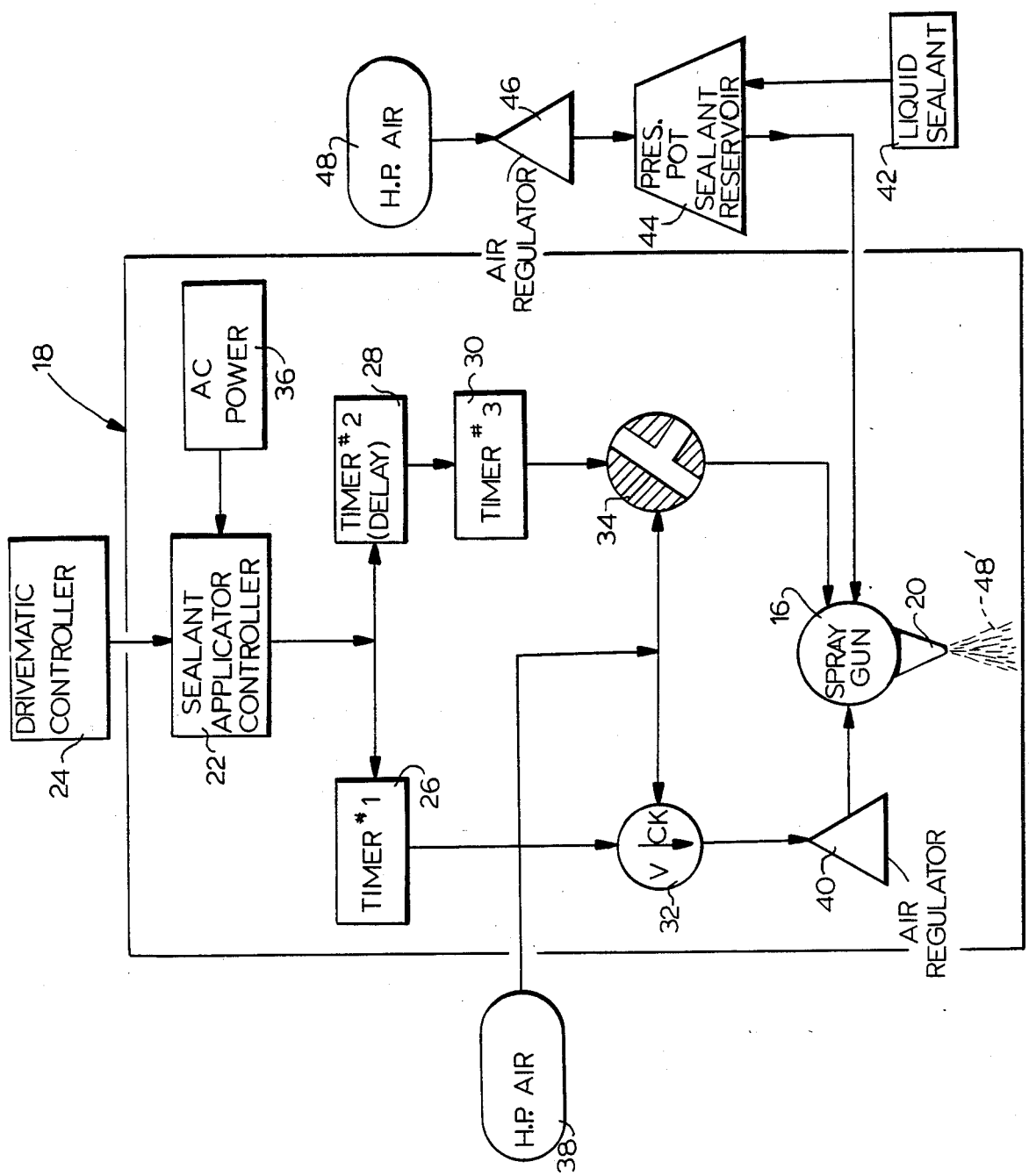
FIG. 3 illustrates schematically a sealant spray system and method for application of sealant employing a spray gun, as illustrated in FIG. 2, and its mode of operation.

Thereafter, as illustrated in FIG. 2, the sealant spray gun 16, which is also mounted on the head 10 of the Drivematic and which is a component of the sealant spray system 18 illustrated schematically in FIG. 3, is positioned adjacent the hole 14, with the nozzle 20 of the spray gun positioned out of contact with and located a predetermined distance from hole 14 of part 12.

As seen in FIG. 3, the sealant spray gun 16 is activated by a sealant applicator controller, indicated at 22, in response to a signal from the Drivematic controller, indicated at 24. The sealant applicator controller 22 consists of three electric timers 26, designated timer #1, 28, designated timer #2, and 30, designated timer #3. Timer #2 is a delay timer which permits actuation of timer #3. As additional components of the sealant applicator controller, there are also provided a 1-way valve 32 associated with timer #1 and a 3-way valve 34 associated with timer #3. Two of the timers 26 and 30 control the two pneumatic valves 32 and 34 which provide air to function the spray gun 16. The timers measure the time in increments, for example, of 1/100th (0.01) of a second. The controller 22 is powered by a source of AC current, e.g., 110 volts, at 36, and is provided with a source of high pressure air 38, e.g., at 90 psi. An air regulator 40 is provided to adjust the air pressure. Liquid sealant at 42 is poured into a pressure pot 44, forming a liquid sealant reservoir. The pressure pot 44 has a high pressure air source 48 and an air regulator 46.

After the hole 14 has been drilled and the sealant spray nozzle 20 is positioned over or opposite the hole 14, current to the sealant spray applicator controller 22 to activate the sealant spray system 18.

The applicator controller 22 activates timer #1, which opens 1-way valve 32 to permit the high pressure air at 38 to begin blowing through the spray gun 16 for a set amount of time. At the same time, the sealant applicator controller 22 activates the delay timer #2, which begins its countdown, at the end of which time timer #2 activates timer #3 to open the 3-way valve 34 to retract the pin (not shown) of the spray gun to permit the flow of liquid sealant from the pressure pot or pressurized sealant reservoir 44 to the spray gun for a predetermined time. The delay timer #2 provides the ability to permit the high pressure air to begin blowing through the gun for a set amount of time before the sealant is permitted to flow.

In the operation of the 3-way valve, one passage thereof is in closed position while a second passage is in open position by activation of timer #3, to permit passage of line pressure air to retract the pin of the spray gun to permit flow of sealant. When timer #3 is deactivated at the end of its time period, the previously closed passage is opened and the second passage is closed to release the air pressure, permitting the pin of the spray gun to move to its forward closed position to stop flow of liquid sealant.

The time setting of timer #1 should always be equal to or greater than the total time setting of timers #2 and #3 combined, to insure the provision of high pressure air while the sealant is being released to the spray gun. Timer #1 is preferably usually set for an additional time, usually a few hundredths of a second longer, than timers #2 and #3 combined, to provide air flow after the sealant flow has stopped, for the important reason noted below. However, if desired, the delay timer #2 an be set for 0.00 seconds so that timer #3 and timer #1 are both immediately activated by the sealant applicator controller 22. Thus, in effect, timer #2 becomes ineffective, and only two operable timers are operated, namely, timer #1 and timer #3. This permits the flow of high pressure air from 38 and the flow of liquid sealant from the liquid sealant reservoir 44 to commence at the same time.

The liquid sealant from 44 and the high pressure air from 38 are mixed in the nozzle 20 of the spray gun 16, such mixing process being in the nature of an air atomizing operation. The atomized mixture of air and sealant is discharged from the nozzle 20 in the form of a spray, indicated at 48′, into the hole 14 of the part 12. The liquid sealant striking the walls of the hole 14 forms a relatively thick deposit of liquid sealant thereon. As noted above, however, after the sealant is deposited upon the walls of the hole and timer #3 has closed the 3-way valve 34 to cease flow of liquid sealant to the spray gun nozzle 20, timer #1 is still activated for an additional period of time, thus blowing high pressure air on the sealant deposit for a predetermined amount of time, until timer #1 is deactivated. Such impingement of high pressure air following deposition of the liquid sealant on the walls of the hole 14 spreads the sealant out to produce a desired thin layer or film of sealant. This feature is illustrated in FIG. 4, which indicates a thick layer of deposited liquid sealant at 50 prior to impingement of high pressure air thereon, and the formation of a thin layer 52 of deposited sealant from the same amount of sealant, after impingement of high pressure air on the initially deposited liquid sealant layer 50.

The invention process and system thus results in a more controlled application of liquid sealant to a drilled hole. The thickness of the sealant coating is controlled by a combination of all three timers 26, 28 and 30 and the air pressure. All of these parameters can be controlled also so that any appreciable excess application of liquid sealant and dripping of liquid sealant are avoided. The provision of a retractable pin on the spray gun, which is retracted by the opening of the 3-way valve 34 to permit flow of sealant to the spray nozzle, further aids in providing the ultimate control and prevention of dripping.

The sealant spray gun, which has separate air and sealant paths that meet at the spray nozzle 20, has three functions that must be controlled by an outside source, namely, the sealant applicator controller. These are: (1) spray gun pin retraction-activation and timing; (2) air flow-activation, timing and pressure; and (3) sealant pressure.

The three items noted above function separately to determine the type of spray that is provided. Making adjustments to any of such items will provide a change in the spray pattern. The pin retraction time and sealant pressure, items (1) and (3) above, affects the volume of sealant that is released in each spray application. The air flow time and pressure, item (2), affects the thickness and diameter of the spray pattern. The sealant applicator controller 22 controls the pin retraction, activated by timer 30, and air flow, activated by timer 26, while the air regulator 46 of the pressure pot 44 controls the sealant pressure. The pressure pot of the sealant spray system can be changed to any desired size to accommodate the sealant volume requirements of the user. The pressure pot must have a constant air pressure source and regulator.

After the film of liquid sealant has been applied to the wall of the hole 14, the head 10 of the Drivematic machine is again shifted to position a fastener inserter (not shown) adjacent the hole to then install a fastener, such as a rivet or lockbolt, into the hole while the sealant is in wet condition. The process and system of the present invention provide an improved form of sealing application for fasteners because it eliminates the hydraulic effects experienced in rivet upsetting when conventional sealant applicators are employed.

The Drivematic machine and spray gun thereon per se are commercially available and form no part of the present invention. The novel aspects of the invention are the spray gun nozzle feature including the means for introducing pressurized air and sealant separately into the nozzle for mixing and atomization therein, and the sealant applicator controller system employed in conjunction therewith.

From the foregoing, it is seen that the invention provides an improved method and sealant spray system for applying liquid sealant in holes prior to fastener installation in the Drivematic cycle. An important feature of the invention is that the sealant is sprayed in the holes, in which fasteners are to be installed, by a non-contact method, as contrasted to the conventional contact method in which the sealant nozzle is placed in direct contact with the holes. When sealant is sprayed according to the invention process, the amount and thickness thereof can be controlled with substantially greater accuracy. The sealant spray process and system of the invention thus have a number of advantages, namely, the invention provides more control over the sealant application; reduces sealant consumption and waste; reduces part clean-up requirements; can be readily adjusted for different applications; provides the thin film sealing application required for automated lockbolt and fastener installation; can be used on several hole diameters without changing nozzles or tips; and eliminates the hydraulic effects experienced in wet fastener installation.

Since various further changes and modifications can be made in the invention without departing from the spirit of the invention, the invention is not to be taken as limited except by the scope of the appended claims.

What is claimed is:

1. In the method for applying liquid sealant in holes of a structural member prior to installing fasteners in such holes, the improvement which comprises the steps of:
    mixing air with a liquid sealant,
    spraying a controlled amount of the resulting air-sealant mixture into the holes and depositing liquid sealant therein, and
    impinging an elevated pressure air stream on the deposited liquid sealant to spread the sealant out and produce a thin layer of said sealant in said holes.

2. The method of claim 1, including providing a spray gun having a spray nozzle and separate air and liquid sealant paths which meet at the spray nozzle to produce said mixing of air with said liquid sealant, and positioning said nozzle adjacent to but out of contact with said holes for said spraying of the resulting air-sealant mixture into said holes.

3. A method for applying liquid sealant in holes of a structural member prior to installing fasteners in said holes, which comprises:
    providing a sealant applicator controller and a spray gun having a spray nozzle positioned adjacent to but out of contact with said holes, a first timer activated by said controller to permit high pressure air to blow through the spray gun, and a second timer activated through said controller to permit a flow of liquid sealant under pressure through said spray gun,
    passing said high pressure air to said nozzle for a first predetermined period of time set by said first timer, and passing said liquid sealant to said nozzle for a second predetermined period of time set by said second timer, said first predetermined time period being longer than said second predetermined time period,
    mixing said high pressure air and liquid sealant in said nozzle to atomize same,
    spraying a controlled amount of the resultant atomized air-liquid sealant mixture into the holes and depositing liquid sealant therein, and
    after said second predetermined time period has passed and liquid sealant ceases to flow to said nozzle, impinging the high pressure air stream alone for the remainder of said first predetermined time period from said nozzle onto the deposited liquid sealant to spread the sealant out and produce a thin layer of said sealant in said holes, and prevent dripping.

4. The method of claim 3, including providing a delay timer activated by said controller, to delay activation of said second timer for a third period of time and permitting the high pressure air to begin flowing through the spray gun for said third predetermined time period before the liquid sealant is permitted to flow, said first predetermined time period being longer than both said second and third predetermined time periods.

5. The method of claim 4, wherein said first timer and said delay timer are simultaneously activated by said controller.

6. The method of claim 3, wherein said first timer and said second timer are simultaneously activated by said controller.

7. A system for applying liquid sealant in holes of a structural member, which comprises:
    a spray gun having a spray nozzle,
    means forming separate air and liquid sealant paths to said spray nozzle for mixing said air and sealant to form an air-sealant spray adapted to be directed into said holes,
    a sealant applicator controller,
    a source of high pressure,
    a first timer actuated by said controller,
    a first valve means actuated by said first timer to permit said high pressure air to flow to said spray nozzle,
    a source of liquid sealant,
    a second timer activated by said controller,
    a second valve means actuated by said second timer to permit a flow of liquid sealant to said spray nozzle,
    said first timer being controllable with respect to said second timer to permit continued flow of high pressure air to said nozzle and adapted to be impinged on the sealant deposit in said holes after said second timer has deactivated said second valve means to cease flow of liquid sealant to said spray nozzle.

8. The system of claim 7 including a delay timer associated with said second timer, and activated by said controller, to delay activation of said second timer for a predetermined period following activation of said first timer, to permit high pressure air to flow to said spray nozzle alone prior to flow of liquid sealant to said spray nozzle.

9. The system of claim 8, said controller being arranged for simultaneous activation of said first timer and said delay timer.

10. The system of claim 7, said source of liquid sealant being a pressurized sealant reservoir.

11. The system of claim 7, said first timer and said second timer being simultaneously activated by said controller.

* * * * *